| (12) | United States Patent | (10) Patent No.: | US 9,977,254 B2 |
|---|---|---|---|
| | Kim et al. | (45) Date of Patent: | May 22, 2018 |

(54) CAMERA LENS MODULE

(71) Applicant: Jahwa Electronics Co., Ltd., Cheongju, Chungcheongbuk-Do (KR)

(72) Inventors: Hee Seung Kim, Seoul (KR); In Soo Kim, Seoul (KR)

(73) Assignee: Jahwa Electronics Co., Ltd., Cheongju, Chungcheongbuk-do (KR)

( * ) Notice: Subject to any disclaimer, the term of this patent is extended or adjusted under 35 U.S.C. 154(b) by 0 days. days.

(21) Appl. No.: 14/523,220

(22) Filed: Oct. 24, 2014

(65) Prior Publication Data

US 2015/0116514 A1    Apr. 30, 2015

(30) Foreign Application Priority Data

Oct. 25, 2013 (KR) .................. 10-2013-0128152
Jan. 15, 2014 (KR) .................. 10-2014-0005285

(51) Int. Cl.
| *H04N 5/228* | (2006.01) |
|---|---|
| *G02B 27/64* | (2006.01) |
| *G03B 13/36* | (2006.01) |
| *H04N 5/225* | (2006.01) |
| *G03B 3/10* | (2006.01) |

(Continued)

(52) U.S. Cl.
CPC ........... *G02B 27/646* (2013.01); *G02B 7/023* (2013.01); *G03B 3/10* (2013.01); *G03B 5/00* (2013.01); *G03B 13/36* (2013.01); *H04N 5/2254* (2013.01); *G03B 2205/0015* (2013.01); *G03B 2205/0069* (2013.01)

(58) Field of Classification Search
USPC ....................................... 348/208.7
See application file for complete search history.

(56) References Cited

U.S. PATENT DOCUMENTS 5,943,169 A * 8/1999 Okada ................. G02B 27/646
                                                    348/E5.046
7,747,152 B2 * 6/2010 Iijima ..................... G03B 5/00
                                                    348/208.11

(Continued)

FOREIGN PATENT DOCUMENTS

| JP | 2004-036541 A | 2/2004 |
|---|---|---|
| JP | 2010-152118 A | 7/2010 |

(Continued)

OTHER PUBLICATIONS

Taiwanese Office Action for Taiwan Application No. 103136778, dated Aug. 25, 2015, 4 pages.

(Continued)

*Primary Examiner* — Stephen Coleman
(74) *Attorney, Agent, or Firm* — Mintz Levin Cohn Ferris Glovsky and Popeo, P.C.; Kongsik Kim; Colleen H. Witherell

(57) ABSTRACT

Disclosed herein is a camera lens module. The camera lens module in accordance with an embodiment of the present invention includes a vibration correction carrier, a rolling unit disposed in parallel to a direction vertical to an optical axis and configured to support the vibration correction carrier, a lens barrel carrier disposed on a side opposite the vibration correction carrier based on the rolling unit, and a base configured to mount the vibration correction carrier and the lens barrel carrier on the base.

11 Claims, 8 Drawing Sheets

(51) Int. Cl.
*G03B 5/00* (2006.01)
*G02B 7/02* (2006.01)

(56) References Cited

U.S. PATENT DOCUMENTS

| | | | |
|---|---|---|---|
| 2002/0196347 A1* | 12/2002 | Ishikawa | H04N 5/23248 |
| | | | 348/208.5 |
| 2011/0026908 A1* | 2/2011 | Nishimura | G02B 27/646 |
| | | | 396/55 |
| 2012/0249814 A1 | 10/2012 | Miyoshi | |
| 2013/0076922 A1 | 3/2013 | Shihoh et al. | |
| 2013/0162851 A1 | 6/2013 | Shikama et al. | |
| 2013/0287383 A1* | 10/2013 | Haruguchi | G03B 3/10 |
| | | | 396/133 |

FOREIGN PATENT DOCUMENTS

| | | |
|---|---|---|
| JP | 2013-003552 A | 1/2013 |
| JP | 2013-160995 A | 8/2013 |
| KR | 10-2009-0127628 A | 12/2009 |
| KR | 10-2011-0025512 A | 3/2011 |
| KR | 10-2012-0045333 A | 5/2012 |
| KR | 10-2013-0072721 A | 7/2013 |
| KR | 10-2014-0076213 A | 6/2014 |
| KR | 1020150020951 A | 2/2015 |
| TW | 201341941 A | 10/2013 |

OTHER PUBLICATIONS

Office Action issued in corresponding Chinese Patent Application No. 201410583844.3.

* cited by examiner

CAMERA LENS MODULE

CROSS REFERENCE TO RELATED APPLICATIONS

The present application claims the benefit of Korean Patent Applications Nos. 10-2013-0128152 and 10-2014-0005285 filed on Oct. 25, 2013 and Jan. 15, 2014, respectively. The applications are incorporated herein by reference.

TECHNICAL FIELD

Various embodiments of the present invention relate to a camera lens module mounted on a mobile electronic device.

RELATED ART

With the recent development of a mobile communication technology, one or more small-sized and lightweight camera lens modules are adopted in the body of a portable terminal, such as a commercial smart phone.

In particular, a recent portable terminal requires a high-capacity and high-performance camera lens module. For this reason, a camera lens module that is equipped with various functions and that is comparable to a digital camera (e.g., DSLR) level is actively developed. Such various functions included in the camera lens module mounted on the portable terminal include a hand vibration correction function in addition to an automatic focus function and a zoom function.

An example of a conventional camera lens module including a hand vibration correction function may include Korean Patent Application Nos. 2010-106811 and 2011-0140262. However, as a portable terminal requires both the high function and the small size, additional elements for providing such a high function need to be further reduced in size.

In particular, a camera lens module equipped with a hand vibration correction function needs to perform precise hand vibration correction using two or more orthogonal resultant forces for such hand vibration correction. However, there is a problem in that precise and fast hand vibration correction is difficult because the size or number of driving units needs to be minimized. That is, there is a problem in that in vibration correction driving controlled by resultant forces in two or more directions, such vibration correction driving is performed greater than a range that needs to be controlled in a process of applying the resultant forces or unnecessary rotation is excessively generated. Such a problem is a factor that deteriorates the accuracy and speed of vibration correction driving, and it needs to be solved in order to perform precise and fast vibration correction driving.

As a result, a camera lens module requires an apparatus capable of preventing a lens from rotating in one direction when the lens is driven in a straight line in an optical axis direction and simultaneously placing the center of the lens (i.e., centering) in the optical axis of the lens by rotating the lens in a direction opposite the direction of the rotation.

SUMMARY

Accordingly, various embodiments of the present invention provide a small-sized camera lens module capable of fast and accurate hand vibration correction driving by suppressing rotatory power that is excessively applied out of a range of driving force when the camera lens module performs hand vibration correction driving.

In accordance with various embodiments of the present invention, a camera lens module may include a vibration correction carrier, a rolling unit disposed in parallel to a direction vertical to an optical axis and configured to support the vibration correction carrier, a lens barrel carrier disposed on a side opposite the vibration correction carrier based on the rolling unit, and a base configured to mount the vibration correction carrier and the lens barrel carrier on the base.

Furthermore, in accordance with various embodiments of the present invention, the camera lens module further includes an Automatic Focus (AF) driving unit disposed between the base and the lens barrel carrier and configured to move the lens barrel carrier along the optical axis.

The AF driving unit may include an automatic focus magnet provided in a first surface of the lens barrel carrier, an auxiliary base provided in one surface of the base and configured to face the automatic focus magnet, an automatic focus coil and an automatic position sensor provided in the auxiliary base and disposed to face the automatic focus magnet, and a camera lens module configured to comprise an AF flexible circuit provided in the auxiliary base.

In accordance with various embodiments of the present invention, the automatic focus driving unit in addition to the driving unit of the vibration correction carrier can be efficiently disposed in a limited space.

Furthermore, there is an advantage in that driving power and power consumption can be minimized by suppressing a malfunction of the vibration correction carrier, such as exceeding a vibration correction range or excessive rotation, because a plurality of segmented yokes forms a single yoke unit.

DETAILED DESCRIPTION

Electronic devices to which a camera lens module in accordance with various embodiments of the present invention may be applied may include, for example, all types of information communication devices and multimedia devices, such as palm-sized Personal Computers (PC), Personal Communication Systems (PCS), Personal Digital Assistants (PDA), Hand-held PCs (HPC), Portable Multimedia Players (PMP), MP3 players, navigators, game machines, laptop computers, netbooks, billboards, TV, digital broadcasting players, and smart phones, and application devices therefor as well as all types of mobile communication terminals that operate in accordance with communication protocols corresponding to various communication systems.

Figure 1:
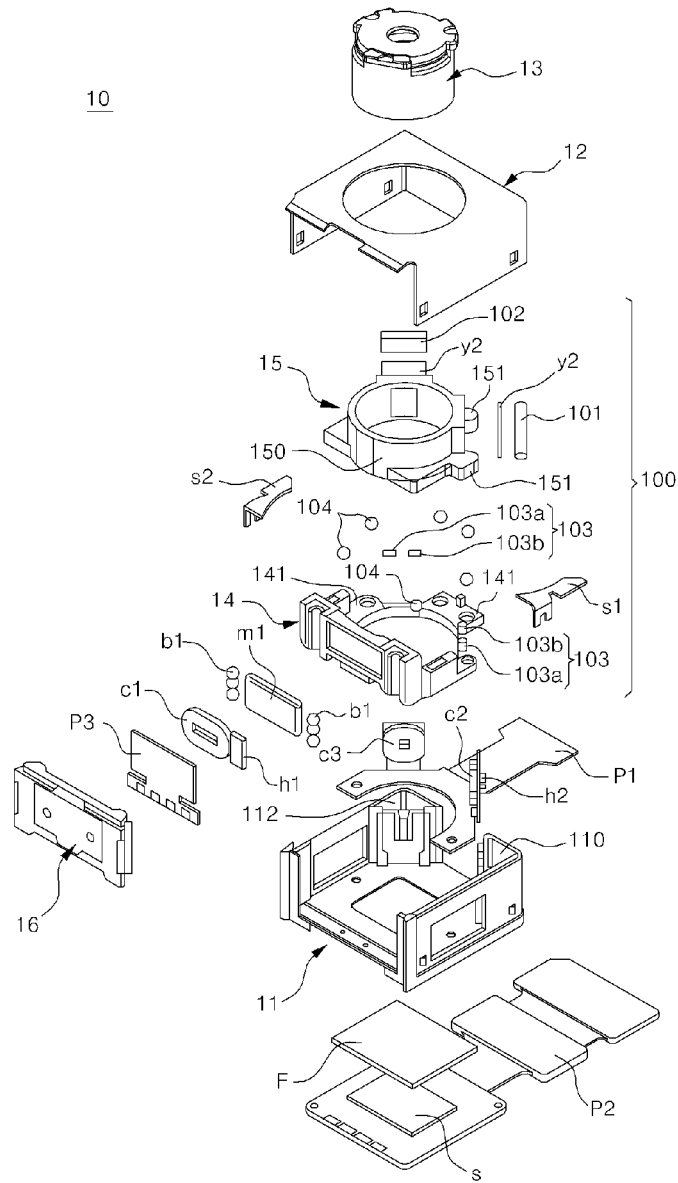
FIG. 1 is an exploded perspective view illustrating the configuration of a camera lens module in accordance with various embodiments of the present invention.
Figure 2:
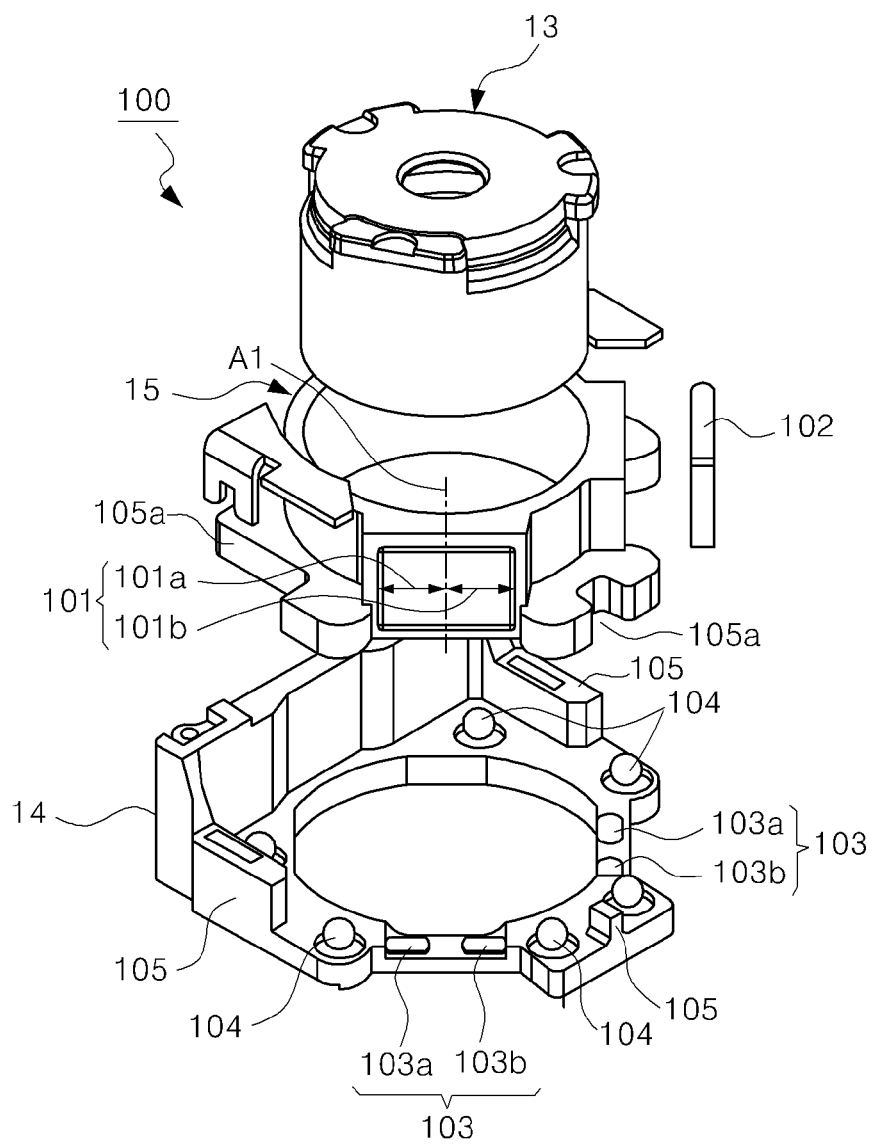
FIG. 2 is a perspective view illustrating a state before a vibration correction carrier, a vibration correction driving unit, and a rolling unit that belong to the elements of the camera lens module in accordance with various embodiments of the present invention are combined.
Figure 8:
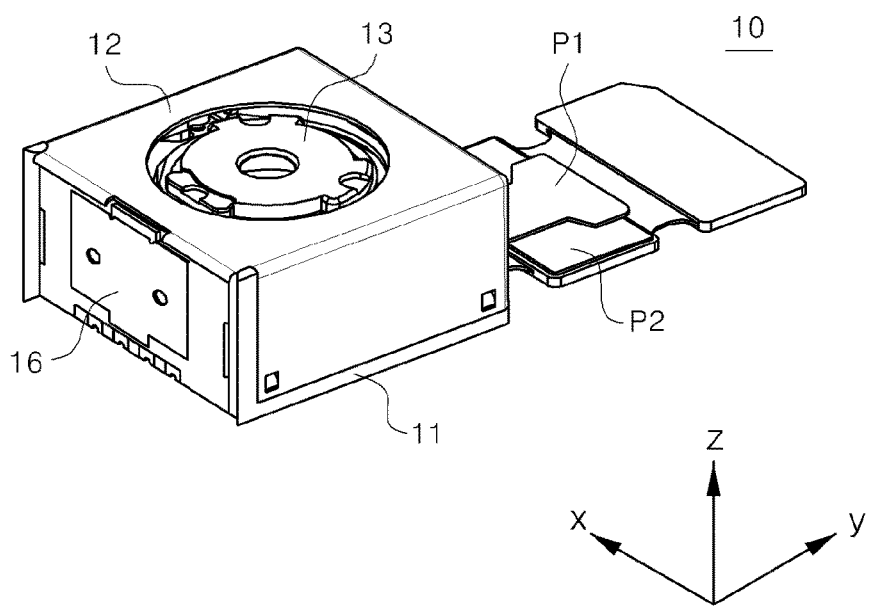
FIG. 8 is a perspective view illustrating the camera lens module assembled in accordance with various embodiments of the present invention.

FIG. 1 is an exploded perspective view illustrating the configuration of a camera lens module 10 in accordance with various embodiments of the present invention, FIG. 2 is a perspective view illustrating a state before a vibration correction carrier 15, a vibration correction driving unit, and a rolling unit 100 that belong to the elements of the camera lens module 10 in accordance with various embodiments of the present invention are combined, and FIG. 8 is a perspective view illustrating the camera lens module 10 assembled in accordance with various embodiments of the present invention.

The configuration of the camera lens module 10 is described below with reference to FIGS. 1 and 2. The camera lens module 10 includes a base 11, a lens barrel carrier 14, an automatic focus driving unit, a vibration correction carrier 15, a vibration correction driving unit, and a rolling unit 100.

The base 11 provides a space in which the lens barrel carrier 14, the automatic focus driving unit, the vibration correction carrier 15, the vibration correction driving unit, and the rolling unit 100 are combined, and the location relationships between the elements are as follows.

The lens barrel carrier 14 is provided on the base 11 so that the vibration correction carrier 15 can be disposed.

The automatic focus driving unit is disposed between the base 11 and the lens barrel carrier 14 and is configured to move the lens barrel carrier 14 in an optical axis.

The vibration correction carrier 15 is placed on the lens barrel carrier 14 so that a lens barrel 13 is provided in the lens barrel carrier 14.

The vibration correction driving unit is provided between the base 11 and the vibration correction carrier 15 and is configured to correct the equilibrium state of the lens barrel carrier 14.

The rolling unit 100 is disposed between the vibration correction carrier 15 and the lens barrel carrier 14 in parallel to a vertical direction, that is, the direction of the optical axis, so that the vibration correction carrier 15 performs vibration correction driving on the lens barrel carrier 14 in response to the rolling operation of the rolling unit 100.

Furthermore, the vibration correction driving unit includes vibration correction magnets 101 and 102, vibration correction coils c2 and c3, and yoke units 103 corresponding to the respective vibration correction magnets 101 and 102. In particular, a plurality of the yoke units 103 may be configured to be separated from each other so that the regions 101a and 101b, 102a and 102b of the vibration correction magnets 101 and 102 included in the vibration correction driving unit are segmented and disposed.

If the yoke units 103 are disposed so that they face the vibration correction magnets 101 and 102 and segment the regions 101a and 101b, 102a and 102b of the magnets as described above, the vibration correction carrier 15 can be prevented from being rotated in one direction when vibration correction driving is performed and simultaneously can be rotated in a direction opposite the direction of the rotation, thereby providing force that maintains the position of the center (i.e., centering). Accordingly, unnecessary rotation occurring when vibration correction driving is performed can be suppressed.

That is, the yoke units 103 include first and second yokes 103a and 103b disposed to face the respective regions 101a and 101b, 102a and 102b divided based on the center A1 of the vibration correction magnets 101 and 102 and separated from each other. Accordingly, the centering of the vibration correction carrier 15 can be easily realized by rotating the vibration correction carrier 15 in one direction and simultaneously rotating the vibration correction carrier 15 in a direction opposite the direction of the rotation.

Furthermore, the lens barrel carrier 14 includes at least one rotation prevention member 105. The at least one rotation prevention member 105 is combined with a groove 105a formed in the vibration correction carrier 15 when the vibration correction carrier 15 rotates and configured to prevent the collision of the vibration correction carrier 15 while suppressing the rotatory power of the vibration correction carrier.

The configuration of the camera lens module is described in more detail below with reference to FIGS. 1 and 2.

FIGS. 1 and 2 illustrate only the external appearance of the camera lens module 10 and thus illustrate only the upper parts of the base 11, the auxiliary base 16, the exterior casing 12, the first and the second flexible circuit boards P1 and P2, and the lens barrel 13 of the camera lens module 10. In the drawings, a three-dimensional X/Y/Z coordinate system has been illustrated, a "Z axis" corresponds to a direction vertical to the camera lens module 10 and means an optical axis along which the lens barrel 13 moves, an "X axis" corresponds to a direction horizontal to the camera lens module 10 (i.e., a direction vertical to the optical axis), and an "Y axis" corresponds to a direction perpendicular to the camera lens module 10 (i.e., the direction vertical to the optical axis and the direction vertical to the X axis). The Automatic Focus (AF) driving unit to be described later provides driving force that controls a focus by moving the lens barrel 13 along the optical axis. An Optical Image Stabilizer (OIS) driving unit acts on the vibration correction carrier (illustrated in FIG. 3) in the XY direction, that is, the direction vertical to the optical axis, and provides driving force that corrects the equilibrium stat in the horizontal direction.

The configuration of the camera lens module 10 in accordance with various embodiments of the present invention is described below with reference to FIG. 1. Lightweight, shortness, and a small size for the camera lens module 10 is sought. For example, the mounting space of the driving units (including the AF driving unit and two vibration correction driving units to be described later) that occupy most of the internal mounting space of the camera lens module 10 is optimized. In particular, in order to reduce the size of the camera lens module 10, a single AF driving unit is disposed on one surface of the camera lens module 10, and the two vibration correction driving units are disposed in two of the edge regions of the camera lens module 10.

In general, the known lens barrel 13 is cylindrical, and the exterior casing 12 has a polyhedron shape, more specifically, a rectangular or square shape. If the lens barrel 13 is housed in such an exterior casing 12, four empty spaces are generated in the four edge regions of the exterior casing 12. The driving units are mounted on some of the four empty spaces in order to achieve a reduction in the size.

In an embodiment of the present invention, in order to optimize the mounting feature of components configured in the camera lens module 10, the AF driving unit is disposed in a region on one side of the exterior casing 12 of the camera lens module 10, and first and second vibration correction driving units are respectively disposed in two first and second edge regions of the four empty spaces included in the four edge regions. In particular, in an embodiment of the present invention, an AF operation and a vibration correction operation are performed in the state in which the vibration correction carrier 15 has been disposed in such a way as to perform a rolling friction operation on the lens barrel carrier 14.

The camera lens module 10 has an external appearance of an approximately rectangular shape and includes the exterior casing 12, the base 11, the auxiliary base 16, the lens barrel 13, the at least one vibration correction unit (including the vibration correction carrier 15 and the vibration correction driving unit), an automatic focus control unit (including the lens barrel carrier 14 and the AF driving unit), the one or more flexible circuit boards P1 and P2, and a guide device configured to guide the at least one lens barrel 13 along the optical axis.

The exterior casing 12 is combined with the base 11 and is configured to receive major components and to perform a housing function for protecting the received components against the outside. The exterior casing may be made of metal and may be responsible for a shield function. The two flexible circuit boards P1 and P2 are externally drawn from the exterior casing 12 so that they are electrically connected to an external power source (not illustrated). One circuit board P1 is a vibration correction flexible circuit board extended from the vibration correction unit, and the other circuit board P2 is an image sensor flexible circuit board.

The lens barrel 13 is configured to have a cylindrical shape and is moved by the AF driving unit along the optical axis, thereby controlling the focus of the lens. The lens barrel carrier 14 is fully received in the base 11. A magnet mounting groove 140 of a flat rectangular shape is provided on the outer circumferential surface of the magnet mounting groove 140.

Furthermore, the lens barrel carrier 14 is guided by a pair of guide devices along the optical axis. The pair of guide devices includes a known guide unit and a plurality of ball bearings b1. The lens barrel 13 may be configured to be separated from or combined with the lens barrel carrier 14 or to be integrated with the lens barrel carrier 14.

In accordance with an embodiment of the present invention, devices for driving the camera lens module 10 include a single AF driving unit and two vibration correction driving units. In an embodiment of the present invention, the AF driving unit is illustrated as including a single AF driving unit.

Furthermore, two vibration correction driving units are disposed on one surface of a side opposite one surface where the AF driving unit is position on the basis of the optical axis in such a way as to be separated from each other. In an embodiment of the present invention, the vibration correction driving unit is illustrated as including the first and the second vibration correction driving units, and the first and the second vibration correction driving units are illustrated as being mounted on the first and second edges, but are not limited to the edge regions. For example, two or more vibration correction driving units may be installed if they can be mounted on empty spaces within the camera lens module 10.

The configuration of the vibration correction driving unit is described below. The vibration correction driving units are disposed in at least two of the vibration edge regions, respectively, thus correcting the hand vibration state of the vibration correction carrier 15.

That is, the first and the second vibration correction driving units are disposed in the first and the second edge regions of the camera lens module 10, respectively. In this case, the first and the second edge regions refer to both edge regions on the opposite side of the AF driving unit, that is, both edges of the vibration correction carrier 15 on which the first and the second vibration correction magnets 101 and 102 are mounted. In other words, the first and the second edge regions refer to respective spaces including both edge regions of the base 11 on the opposite side of the AF driving unit.

The first and the second vibration correction driving units are disposed to face each other in the central direction of the optical axis in the first and the second edge regions that confront the AF driving unit. The first and the second vibration correction driving units are symmetrically disposed in the first and the second edge regions, respectively, in such a way as to face each other, thus correcting the equilibrium state (i.e., the XY axes) of the vibration correction carrier 15 along the optical axis through the resultant force of electromagnetic force generated from the first and the second vibration correction driving units.

The first vibration correction driving unit includes the first vibration correction magnet 101. The first vibration correction magnet 101 is mounted on the mounting groove provided in an outer surface of the vibration correction carrier 15 and is disposed in the first edge region of the vibration correction carrier 15 in such a way as to face the central direction. The first vibration correction driving unit further includes a first vibration correction coil c2. The first vibration correction coil c2 is disposed in the first edge region of the base 11 in such a way as to face the central direction and is spaced apart from the first vibration correction magnet 101 in such a way as to face the first vibration correction magnet 101. The first vibration correction driving unit further includes a first position sensor h1 disposed in the first edge region of the base 11 and disposed on the back of the first vibration correction coil c2 or in a coil hollow unit. The first edge region may be assumed to have a triangular prism shape that is approximately parallel to the direction of the optical axis.

When an electric current is applied to the first vibration correction coil c2, electromagnetic force is generated by the first vibration correction magnet 101 and the first vibration correction coil c2. The electromagnetic force becomes one piece of driving force for correcting the vibration of the lens barrel 13 in the XY axes. In this case, the first position sensor h2 may be a hall sensor.

The second vibration correction driving unit includes the second vibration correction magnet 102. The second vibration correction magnet 102 is mounted on a mounting groove provided in an outer surface of the vibration correction carrier 15 and is disposed in the second edge region of the vibration correction carrier 15 in such a way as to face the central direction. The second vibration correction driving unit further includes the second vibration correction coil c3. The second vibration correction coil c3 is disposed in the second edge region of the base 11 in such a way as to face the central direction and is spaced apart from the second vibration correction magnet 102 in such a way as to face the second vibration correction magnet 102. The second vibration correction driving unit further includes a second position sensor h2 disposed in the second edge region of the base 11 and disposed at the back of the second vibration correction coil c3 or in a coil hollow unit. Likewise, the second edge region may be assumed to have an approximately triangular prism shape.

When an electric current is applied to the second vibration correction coil c3, electromagnetic force is generated by the second vibration correction magnet 102 and the second vibration correction coil c3. The electromagnetic force becomes the other piece of driving force for correcting the vibration of the lens barrel 13 in the XY axes. In this case, the second position sensor h2 may be a hall sensor. Accordingly, the vibration correction carrier 15 may correct the vibration state of the lens barrel on the basis of the XY axes by means of the resultant force of the first and the second vibration correction magnets 101 and 102 and the first and second vibration correction coils c2 and c3.

The first position sensor h1 is disposed in the outskirts of the first edge region. More specifically, the first position sensor h1 is disposed at the back of the first vibration correction coil c2 and is disposed to directly face the first vibration correction magnet 101 through a first aperture within the first vibration correction coil c2. Furthermore, the second position sensor h2 is disposed in the outskirts of the second edge region. More specifically, the second position sensor h2 is disposed at the back of the second vibration correction coil c3 and is disposed to directly face the second vibration correction magnet 102 through a second aperture within the second vibration correction coil c3.

Figure 7:
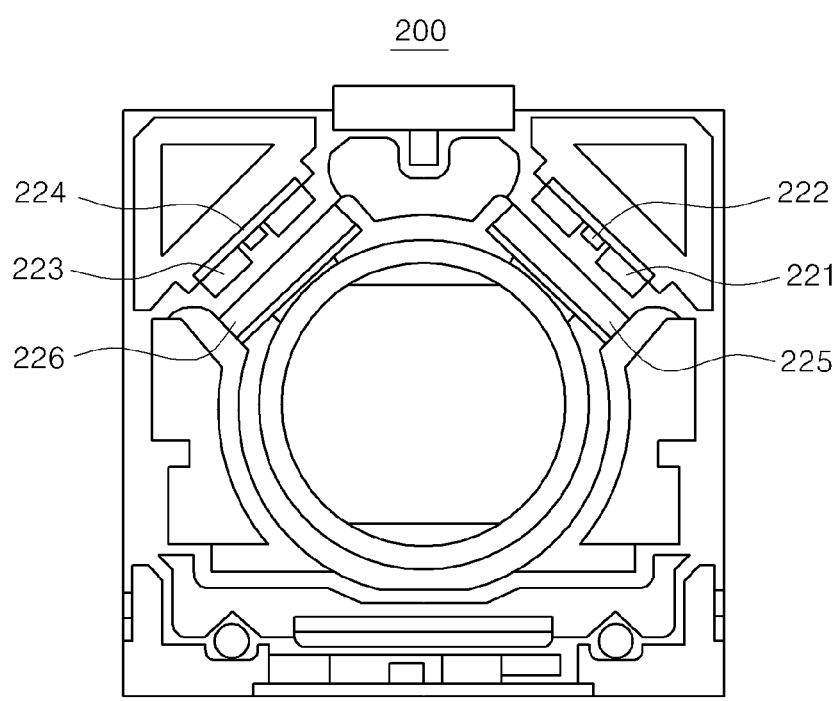
FIG. 7 is a cross-sectional view illustrating a different deployment of the position sensor of the camera lens module in accordance with various embodiments of the present invention.

Furthermore, the first and the second vibration correction position sensors h1 and h2 may be received in the respective internal spaces of the first and the second vibration correction coils and mounted in such a way as to face the first and the second vibration correction magnets 101 and 102. FIG. 7 illustrates a different deployment of such a position sensor. That is, the first and the second position sensors h1 and h2 of FIG. 1 are illustrated as being disposed at the backs of the first and second vibration correction coils, whereas first and second position sensors 222 and 224 of FIG. 7 are illustrated as being disposed in the respective internal housing spaces of first and second vibration correction coils 221 and 223. In this case, the first and second vibration correction cols 221 and 223 are coreless type coils and include the housing spaces therein, and thus the first and the second position sensors 222 and 224 are disposed in the respective internal housing spaces of the first and second vibration correction cols 221 and 223 so that they directly face the first and second vibration correction magnets 225 and 226. Such a deployment structure further improves a component mounting feature.

Meanwhile, the AF driving unit is disposed between the auxiliary base 16, combined with one surface of the exterior casing 12 that faces the AF driving unit, and one side of the lens barrel carrier 14 and is configured to move the lens barrel 13 along the optical axis.

The AF driving unit includes an automatic focus magnet m1 placed on the outer circumferential surface of the lens barrel carrier 14 and mounted in parallel to one surface of the casing 12, the automatic focus coil c1 disposed in the auxiliary base 16 and disposed to face the automatic focus magnet m1, and a driving Integrated Circuit (IC) disposed beside the automatic focus coil c1. When an electric current is applied to the automatic focus coil c1, the lens barrel 13 is moved along the optical axis by electromagnetic force generated by the automatic focus coil c1 and the automatic focus magnet m1. Accordingly, a focal distance between the lens and an image sensor (not illustrated) is automatically controlled.

The first position sensor h1 may be disposed in the internal housing space of the automatic focus coil c1 or disposed beside the automatic focus coil c1 and may be included in the driving IC. The first position sensor h1 may include a hall sensor.

The AF driving unit includes an automatic circuit board P3 disposed in the internal surface of the auxiliary base 16 and the automatic circuit board P2 disposed on a top surface of the base 11. The automatic circuit board P3 and the vibration correction circuit board P1 are made of flexible materials. The automatic circuit board P1 is attached to the auxiliary base 16 along the optical axis, and the vibration correction circuit board P2 is attached on a surface of the base 11 in a direction vertical to the optical axis.

In FIG. 1, reference numeral "F" denotes an "IR filter", and reference numeral denotes an "image sensor". Furthermore, reference numeral "s1 and s2" denote stoppers.

Meanwhile, the vibration correction carrier 15 includes a hollow body 150 configured to have an internal space for receiving the lens barrel 13 in the direction of the optical axis and one or more first support bodies 151 protruded in an outer circumference direction from the bottom of the hollow body 150 and spaced apart from each other. Furthermore, the vibration correction carrier 15 is mounted in an open part of the lens barrel carrier 14 in such a way as to face the base 11. The hollow body 150 of the vibration correction carrier 15 surrounds the outer circumferential surface of the lens barrel 13 and has a gap therein because the lens barrel 13 is received in the hollow body 150. An opening is formed between the first support bodies 151, and thus the one or more yoke units 103 directly face the first and the second vibration correction magnets 101 and 102. Accordingly, gravitational force between the yoke units 103 and the first and the second vibration correction magnets 101 and 102 enables the vibration correction carrier 15 to be centered on the automatic carrier 14.

Meanwhile, the rolling unit 100 is provided between the top of the lens barrel carrier 14 and the bottom of the vibration correction carrier 15 and is configured to center the position of the vibration correction carrier 15. The rolling unit 100 includes the first and the second vibration correction magnets 101 and 102, the one or more yokes 103, and a plurality of ball bearings 104. The ball bearings 104 are spaced apart from each other at specific intervals, disposed between the lens barrel carrier 14 and the vibration correction carrier 15 in such a way as to be brought in contact with them, and configured to support the vibration correction carrier 15.

The yoke units 103 are disposed to be symmetrical to the lens barrel carrier 14 and are disposed to face the first and the second vibration correction magnets 101 and 102, respectively, which form the first and the second vibration correction driving units. The yoke units 103 may be made of a magnetic substance, for example, metal. The position of the vibration correction carrier 15 can be stably centered on the ball bearings 104 through gravitational force between the yoke units and the first and the second vibration correction magnets 101 and 102, and the position of the center of the vibration correction carrier 15 can be controlled by a fine rolling operation. The ball bearings 104 are disposed between the bottom of the first support bodies 151 and the top of second support bodies 141 and are driven.

In this case, as illustrated in FIG. 2, the rolling unit 100 includes the one or more yoke units 103 disposed in the lens barrel carrier 14 and spaced apart from each other so that they segment the regions 101a and 101b, 102a and 102b of the first and the second vibration correction magnets 101 and 102.

That is, each of the yoke units 103 includes the first and the second yokes 103a and 103b segmented and disposed so that they face the regions 101a and 101b, 102a and 102b, respectively, which are divided based on the center A1 of the first and the second vibration correction magnets 101 and 102.

In other words, one pair of the first and the second yokes 103a and 103b is separated from each other and disposed in the respective regions 101a and 101b of the first vibration correction magnet 101, and the other pair of the first and the second yokes 103a and 103b are separated from each other and disposed in the respective regions 102a and 102b of the second vibration correction magnet 102.

Figure 3:
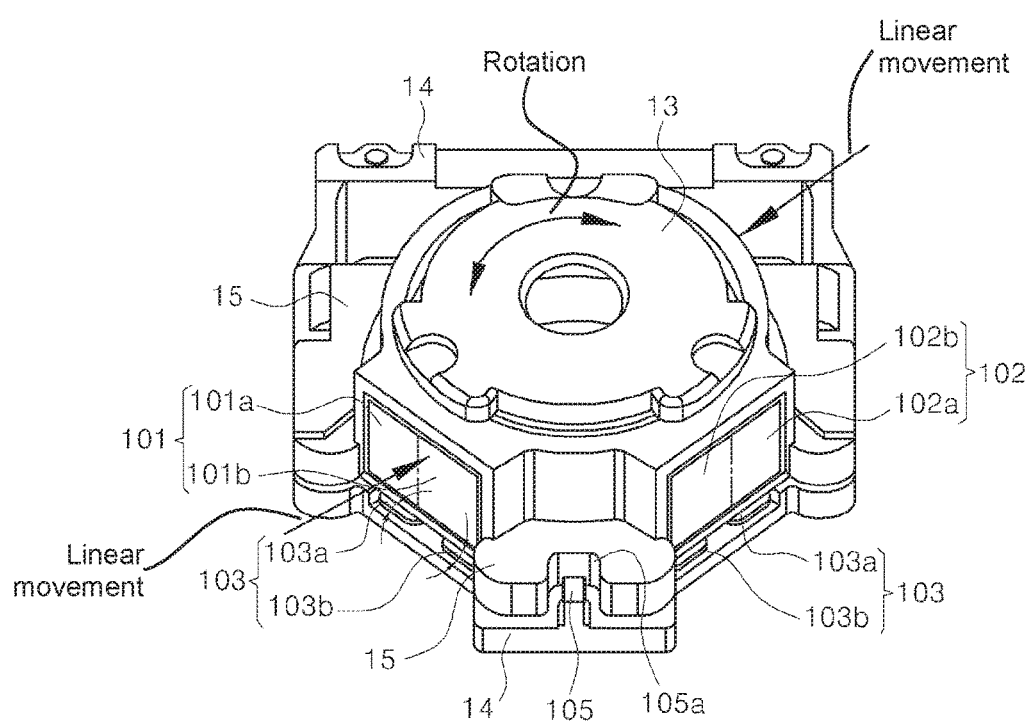
FIG. 3 is a perspective view illustrating that the vibration state of a lens barrel is corrected on the basis of an X axis in the camera lens module in accordance with various embodiments of the present invention.

The operation of the rolling unit 100 is described in more detail below. FIG. 3 is a perspective view illustrating that the vibration state of the lens barrel 13 is corrected on the basis of the X axis in the camera lens module 10 in accordance with various embodiments of the present invention, and FIG. 4 is an enlarged perspective view illustrating that the vibration state of the lens barrel 13 is corrected on the basis of the X axis in the camera lens module in accordance with various embodiments of the present invention.

Figure 4:
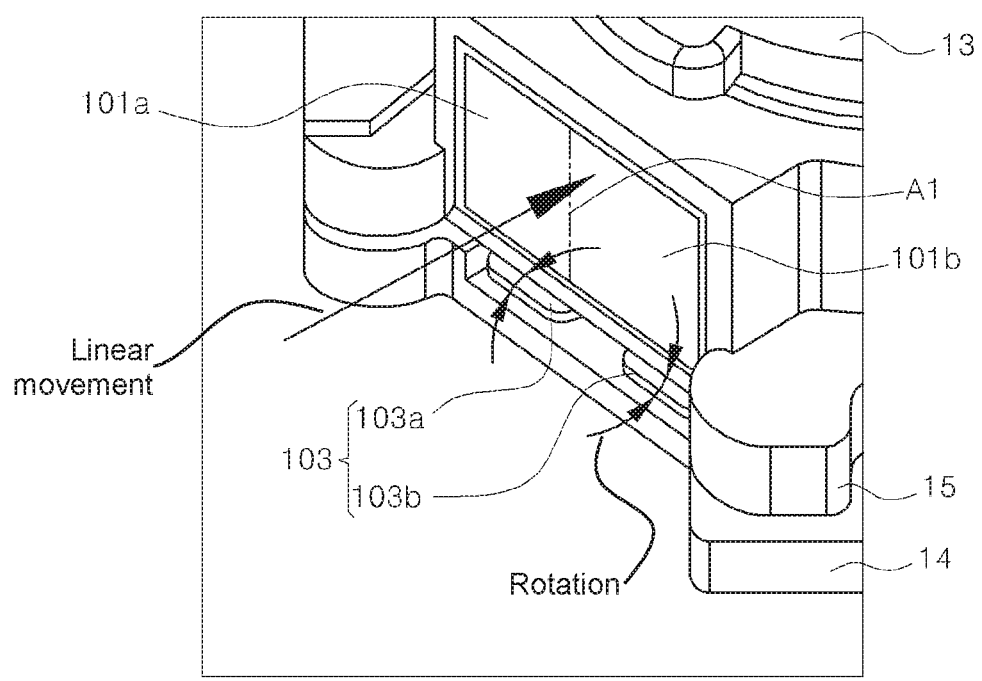
FIG. 4 is an enlarged perspective view illustrating that the vibration state of a lens barrel is corrected on the basis of the X axis in the camera lens module in accordance with various embodiments of the present invention.

As illustrated in FIGS. 3 and 4, when an electric current is applied to the automatic focus coil c1 of the AF driving unit, the lens barrel 13 moves in a straight line along the optical axis. Accordingly, a focal distance between the lens and the image sensor (not illustrated) is automatically controlled.

When the lens barrel 13 moves in a straight line as described above and thus driving power is generated, the vibration correction carrier 15 combined with the lens barrel 13 also moves in a straight line and thus generates rotatory power in one direction.

In this case, when an electric current is applied to the first vibration correction coil c2 of the first vibration correction driving unit in order to correct the vibration of the vibration correction carrier 15, electromagnetic force is generated by the first vibration correction magnet 101 and the first vibration correction coil c2. The electromagnetic force results in driving force for correcting the vibration of the lens barrel 13 in the X axis.

In other words, when the vibration correction carrier 15 is driven, the lens barrel 13 and the vibration correction carrier 15 together generate rotatory power.

In this case, since the first yoke 103a is disposed to face the region 101a on one side of the first vibration correction magnet 101, the magnetic force of the first yoke 103a and the first vibration correction magnet 101 rotates the vibration correction carrier 15 only in one direction.

At the same time, since the second yoke 103b is disposed to face the region on the other side of the first vibration correction magnet 101, the magnetic force of the second yoke 103b and the first vibration correction magnet 101 rotates the vibration correction carrier 15 only in the other direction.

Accordingly, the first and the second yokes 103a and 103b center the position of the vibration correction carrier 15 through magnetic force that reacts to the first vibration correction magnet 101 (i.e., provides centering).

Figure 5:
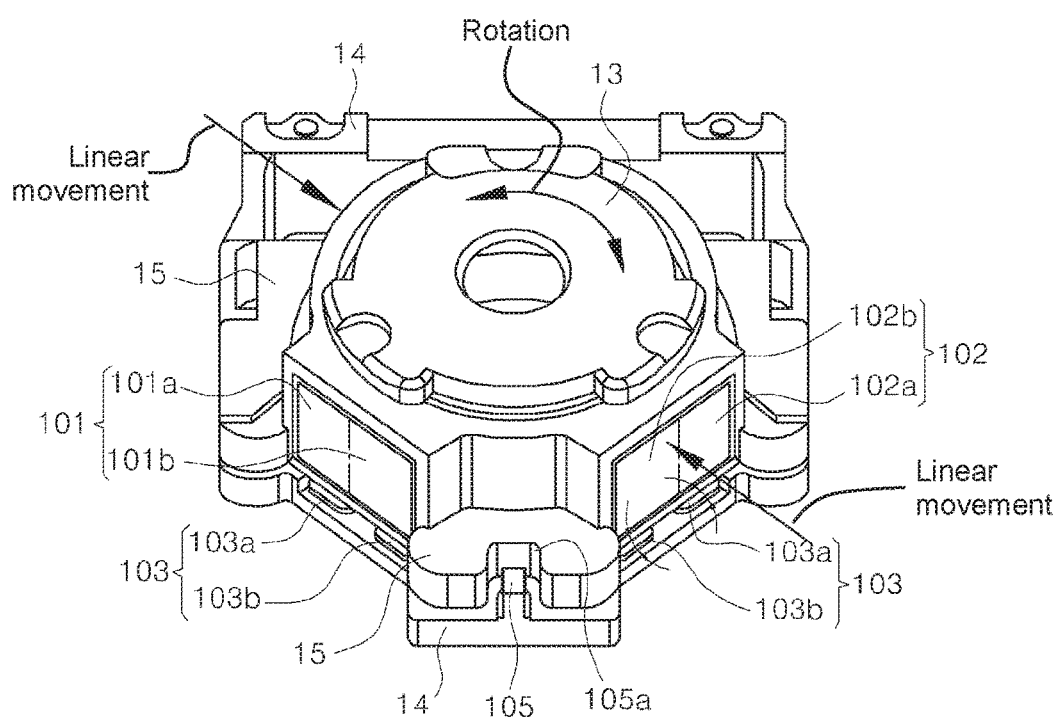
FIG. 5 is a perspective view illustrating that the vibration state of a lens barrel is corrected on the basis of an Y axis in the camera lens module in accordance with various embodiments of the present invention.
Figure 6:
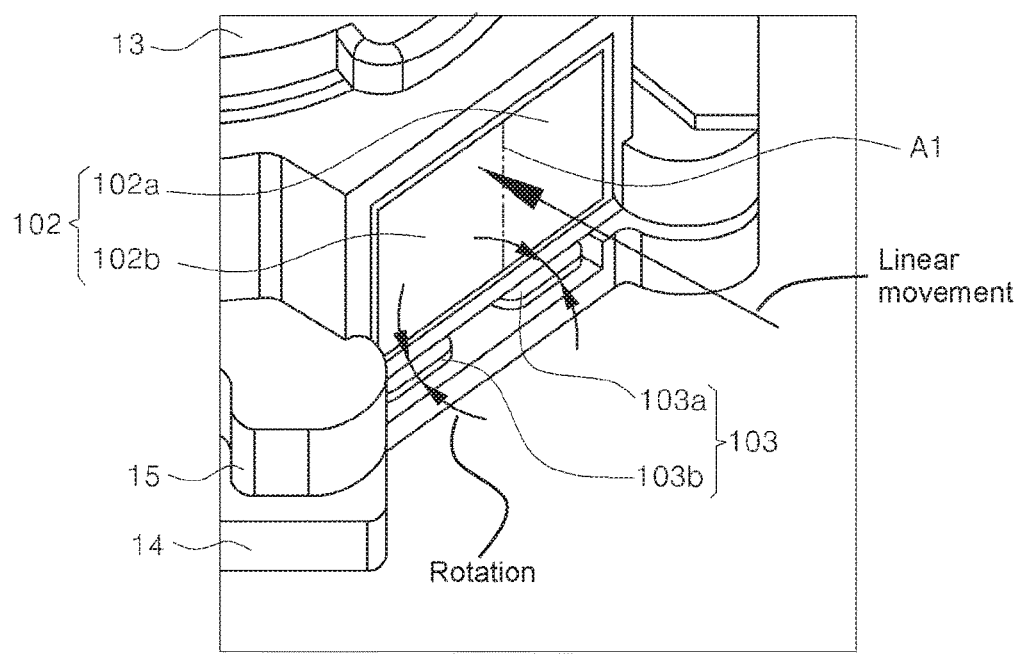
FIG. 6 is an enlarged perspective view illustrating that the vibration state of a lens barrel is corrected on the basis of the Y axis in the camera lens module in accordance with various embodiments of the present invention.

FIG. 5 is a perspective view illustrating that the vibration state of the lens barrel 13 is corrected on the basis of the Y axis in the camera lens module 10 in accordance with various embodiments of the present invention, and FIG. 6 is an enlarged perspective view illustrating that the vibration state of the lens barrel 13 is corrected on the basis of the Y axis in the camera lens module 10 in accordance with various embodiments of the present invention.

As illustrate din FIGS. 5 and 6, a principle that the camera lens module corrects the vibration state of the lens barrel 13 on the basis of the Y axis is the same as the principle that the camera lens module corrects the vibration state of the lens barrel 13 on the basis of the X axis.

That is, when the vibration correction carrier 15 is driven, the lens barrel 13 and the vibration correction carrier 15 together generate rotatory power. At this time, the first yoke 103a and the second yoke 103a try to generate rotatory power in opposite directions due to the magnetic force of the second vibration correction magnet 102. Accordingly, the position of the vibration correction carrier 15 is centered.

That is, an existing camera lens module including a hand vibration correction function is configured to have yokes correspond to the shapes of vibration correction magnets in a one-to-one manner. Accordingly, the existing camera lens module is problematic in that the position of the lens is not centered because the driving unit of the lens drives the lens in a straight line in the direction of the optical axis and when vibration is corrected, the lens is rotated only in one direction.

Accordingly, in the present embodiment, the camera lens module includes the plurality of yoke units 103 configured to segment the regions 101a and 101b, 102a and 102b of the first and the second vibration correction magnets 101 and 102. Accordingly, the vibration correction magnets and the yoke units 103 can easily center the position of the vibration correction carrier 15 through electromagnetic force in opposite directions.

In particular, the camera lens module in accordance with various embodiments of the present invention may be applied as a camera lens module mounted on a mobile electronic device and configured to be lightweight, short, and small in size.

The camera lens module of the various embodiments of the present invention is not limited to the aforementioned embodiments and drawings, and those skilled in the art will evidently appreciate that various modifications, additions and substitutions are possible without departing from the technical scope of the invention.

What is claimed is:
1. A camera lens module, comprising:
a vibration correction carrier;
a rolling unit disposed in parallel to a direction vertical to an optical axis and configured to support the vibration correction carrier;
a lens barrel carrier disposed on a side opposite the vibration correction carrier based on the rolling unit; and
a base configured to mount the vibration correction carrier and the lens barrel carrier on the base,
wherein the vibration correction carrier is received within the lens barrel carrier and both of the vibration correction carrier and the lens barrel carrier are in contact with the rolling unit,
wherein the lens barrel carrier is configured to perform an auto-focus adjustment movement that accommodates the vibration correction carrier to perform a movement in a plane orthogonal to the optical axis, and
wherein in an autofocus operation, the lens barrel carrier and the vibration correction carrier move in the same direction.

2. The camera lens module of claim 1, wherein the vibration correction carrier comprises:
- a hollow body configured to have a lens barrel received along the optical axis;
- one or more first support bodies protruded from a bottom of the hollow body in an outer circumference direction and spaced apart from each other; and
- one or more first apertures disposed between the first support bodies.

3. The camera lens module of claim 1, further comprising an Automatic Focus (AF) driving unit disposed between the base and the lens barrel carrier and configured to move the lens barrel carrier along the optical axis,
wherein the AF driving unit comprises:
- an automatic focus magnet provided in a first surface of the lens barrel carrier;
- an auxiliary base provided in one surface of the base and configured to face the automatic focus magnet;
- an automatic focus coil and an automatic position sensor provided in the auxiliary base and disposed to face the automatic focus magnet; and
- a camera lens module configured to comprise an AF flexible circuit provided in the auxiliary base.

4. The camera lens module of claim 1, wherein the rolling unit comprises a plurality of ball bearings disposed between the lens barrel carrier and the vibration correction carrier in such a way as to come in contact with the lens barrel carrier and the vibration correction carrier and configured to support the vibration correction carrier.

5. The camera lens module of claim 1, further comprising vibration correction driving units disposed between the vibration correction carrier and the base and placed in at least two edge regions of the camera lens module.

6. The camera lens module of claim 5, wherein each of the vibration correction driving units comprises:
- at least one vibration correction magnet placed beside the vibration correction carrier, and
- a yoke unit corresponding to the vibration correction magnet.

7. The camera lens module of claim 6, wherein:
the yoke unit comprises a plurality of segmented yokes, and
the segmented yokes are disposed in respective regions divided based on centers of the vibration correction magnet in such a way as to face each other.

8. The camera lens module of claim 6, wherein each of the vibration correction driving units comprises a vibration correction coil and a vibration correction position sensor disposed in an edge region of the base and supported to face the vibration correction magnet.

9. The camera lens module of claim 8, wherein each of the vibration correction driving units further comprises a back yoke provided in one surface of an edge region of the vibration correction carrier and closely attached to the vibration correction magnet.

10. The camera lens module of claim 8, further comprising a perpendicular unit extended from the edge region of the base in a direction of the optical axis and configured to have a triangular prism shape.

11. The camera lens module of claim 8, wherein the vibration correction position sensor is placed in a support at a back of the vibration correction coil and configured to face the vibration correction magnet through an internal space of the vibration correction coil, or the vibration correction position sensor is received in the internal space of the vibration correction coil and configured to face the vibration correction magnet.

* * * * *